US007411963B2

(12) United States Patent
Ward et al.

(10) Patent No.: US 7,411,963 B2
(45) Date of Patent: Aug. 12, 2008

(54) METHOD FOR DISSEMINATION OF NON-ROUTING INFORMATION USING THE IS-IS PROTOCOL

(75) Inventors: David D. Ward, Somerset, WI (US); Jean-Philippe Vasseur, Dunstable, MA (US); Stefano B. Previdi, Rome (IT)

(73) Assignee: Cisco Technology, Inc., San Jose, CA (US)

( * ) Notice: Subject to any disclaimer, the term of this patent is extended or adjusted under 35 U.S.C. 154(b) by 577 days.

(21) Appl. No.: 11/040,629

(22) Filed: Jan. 19, 2005

(65) Prior Publication Data

US 2006/0159083 A1    Jul. 20, 2006

(51) Int. Cl.
*H04L 12/26* (2006.01)
*H04J 3/14* (2006.01)
*G08C 15/00* (2006.01)
*G06F 11/00* (2006.01)

(52) U.S. Cl. .................. 370/398; 370/238; 370/389; 370/401; 709/223

(58) Field of Classification Search ......... 370/217–221, 370/238–255, 389–395, 401–467; 709/204–229, 709/238–242
See application file for complete search history.

(56) References Cited

U.S. PATENT DOCUMENTS

| | | | | |
|---|---|---|---|---|
| 6,665,273 B1 * | 12/2003 | Goguen et al. | ............... | 370/252 |
| 6,820,120 B1 * | 11/2004 | Keats et al. | ................ | 709/223 |
| 6,823,395 B1 * | 11/2004 | Adolfsson | .................... | 709/242 |
| 2005/0047413 A1 * | 3/2005 | Ilnicki et al. | ................ | 370/392 |
| 2005/0074001 A1 * | 4/2005 | Mattes et al. | ................ | 370/389 |
| 2005/0160171 A1 * | 7/2005 | Rabie et al. | .................. | 709/227 |
| 2005/0276216 A1 * | 12/2005 | Vasseur et al. | ............... | 370/222 |
| 2006/0120288 A1 * | 6/2006 | Vasseur et al. | .............. | 370/235 |
| 2006/0140111 A1 * | 6/2006 | Vasseur et al. | .............. | 370/216 |

(Continued)

OTHER PUBLICATIONS

Y. Rekhter, et al., "A Border Gateway Protocol 4 (BGP-4)", Network Working Group Internet Draft, Obsoletes: Request for Comments: 1771, Oct. 2004. (Reference on enclosed CD-Rom).

(Continued)

*Primary Examiner*—Man Phan
(74) *Attorney, Agent, or Firm*—Hickman Palermo Truong & Becker LLP (57) ABSTRACT

A method and apparatus for the dissemination of non-routing information to nodes of a network is provided. A new type of IS-IS packet (called a NRI IS-IS packet) is described that exclusively carries non-routing information. When the NRI IS-IS packet is received by a router, the router may send the NRI IS-IS packet to an appropriate component responsible for processing non-routing information, without analyzing, verifying, and validating the information carried in each TLV and sub-TLV of the NRI IS-IS packet. Advantageously, the time it takes for routers of the network to achieve convergence is decreased since a IS-IS packet reader need not analyze, verify, and validate information not related to network topology and IP routing. Therefore, when NRI IS-IS packets are received, there is no impact in the convergence time of nodes in the network.

26 Claims, 4 Drawing Sheets

U.S. PATENT DOCUMENTS

| | | | |
|---|---|---|---|
| 2006/0209719 A1* | 9/2006 | Previdi et al. | 370/254 |
| 2006/0291391 A1* | 12/2006 | Vasseur et al. | 370/235 |
| 2007/0011284 A1* | 1/2007 | Le Roux et al. | 709/223 |
| 2007/0058568 A1* | 3/2007 | Previdi et al. | 370/254 |

OTHER PUBLICATIONS

Y. Rekhter, et al., "A Border Gateway Protocol 4 (BGP-4)", Network Working Group Request for Comments: 1771, Mar. 1995. (Reference on enclosed CD-ROM).

T. Bates, et al., "Multiprotocol Extensions for BGP-4", Network Working Group Request for Comments: 2858, Jun. 2000. (Reference on enclosed CD-ROM).

R. Chandra, et al., "Capabilities Advertisement with BGP-4", Network Working Group Request for Comments: 3392, Nov. 2002. (Reference on enclosed CD-ROM).

* cited by examiner

METHOD FOR DISSEMINATION OF NON-ROUTING INFORMATION USING THE IS-IS PROTOCOL

FIELD OF THE INVENTION

The present invention generally relates to routing data in a network. The present invention more specifically relates to the dissemination of non-routing information using the IS-IS protocol.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

In computer networks such as the Internet, packets of data are sent from a source to a destination via a network of links (communication paths such as telephone or optical lines) and nodes (usually routers directing the packet along one or more of a plurality of links connected to it) according to one of various routing protocols.

In the network, some nodes represent end systems (such as printers, fax machines, telephones, PC's etc) whereas other nodes represent network devices (e.g. switches, routers etc). The data packets are sent around the network from a source to a destination in accordance for example with routing information shared among the nodes of the network. As the network comprises a plurality of interconnected nodes, the network is fairly robust. Should a node or link fail for any reason, the network dynamically configures to re-route data so as to avoid the failed node. When a node or link comes into existence on a network, for instance through repair or by addition of a new node, the network dynamically converges to a so-called converged state wherein all the routers of the network have common routing information.

One class of routing protocols that rely on shared information is the link state protocol. Examples of link state protocols are the Intermediate System-to-Intermediate System (IS-IS) protocol and the Open Shortest Path First (OSPF) protocol. The IS-IS protocol is specified in ISO 10589, with extensions for supporting IPv4 specified in RFC 1195.

A link state protocol relies on a routing algorithm resident at each node of a network. Each node of the network advertises, throughout the network, links to neighboring nodes and provides a cost associated with each link that can be based on any appropriate metric such as link bandwidth or delay and is typically expressed as an integer value. A link may have an asymmetric cost, that is, the cost in the direction AB along a link may be different from the cost in a direction BA.

Based on the advertised information in the form of a link state packet (LSP), each node constructs a link state database (LSDB), which is a map of the entire network topology, and from that constructs generally a single optimum route to each available node. A link can be thought of as an interface on a router. The state of the link is a description of that interface and of its relationship to its neighboring routers. A description of the interface may include, for example, the IP address of the interface, the mask, the type of network it is connected to, the router connected to that network and so on. The collection of all link states for the whole network forms the link-state database.

Each LSP is composed of a fixed header and a number of tuples, each consisting of a type, a length, and a value. Such tuples are commonly referred to as TLVs. Specialized tuples may also be used, which are referred to as sub-TLVs. TLVs and sub-TLVs may be used to encode information in a flexible and extensible format.

Link state protocols use a link state algorithm to build and calculate the shortest path to all known destinations. The algorithms for determining a shortest path are complicated but the following provides a simplified view of the steps of a link state algorithm. Upon initialization or due to any changing routing information, a router generates an advertisement LSP. This advertisement represents the collection of all link states on that router. All routers exchange LSPs by means of flooding. Each router that receives a link state update stores a copy in its link state database and then rapidly propagates the update to other routers. After the database of each router is completed, each router calculates the shortest (lowest cost) path to all designations and uses this information to form an IP routing table. In some instances two or more routers of equal cost present themselves, termed an "equal cost path split." One appropriate algorithm is a shortest path first (SPF) algorithm.

As a result, a "spanning tree" is constructed, rooted at the node and showing an optimum path including intermediate nodes to each available destination node. Conversely, a "reverse spanning tree" can be constructed showing the optimum path to a given node from all nodes from which it is reachable. Because each node has a common LSDB (other than when advertised changes are propagating around the network) any node is able to compute the spanning and reverse spanning tree rooted at any other node. The results of the SPF are stored in a routing table (also known as a routing information base (RIB)) and, based on these results, the forwarding information base (FIB) or forwarding table is updated to control forwarding of packets appropriately.

In link state protocols, when a link or a node fails and is subsequently repaired, or there is some other change to the network such as a change of link cost, the routers involved with the repaired part of the network then have to re-establish convergence. This is achieved by the router(s) advertising themselves or the change throughout the network area. However, during topology change, there is a short period of time in which LSDBs, RIBs and FIBs across a network become inconsistent as information about a change is propagated through the network. Routes generated during this period of inconsistency may result in routing loops, which persist until the databases have converged, at which point there should be no loops, by definition. Consequently, it is advantageous to minimize the amount of time necessary for a set of routers to achieve convergence, which is the time when the LSDBs, RIBs and FIBs of the routers involved are consistent which each other.

As explained above, the IS-IS protocol may be used to carry routing information. Routing information, as used herein, refers to information describing the link state of a link of a network used in converging the nodes of a network. For example, the routers of a network may exchange routing information to ensure that each router's LSDBs, RIBs and FIBs are consistent which each other.

In recent years, many extensions have been made to the IS-IS protocol to allow IS-IS packets (packets that conform to the IS-IS protocol) to carry non-routing information in addition to routing information. Non-routing information, as used herein, refers to information that does not qualify as routing information, which may be used to provide additional services beyond that of strictly routing packets. For example, non-routing information may be used by a multi-protocol label switching-traffic engineering (MPLS-TE) component of a router in order to create, signal, and establish TE tunnels. Non-routing information may include Traffic Engineering (TE) information. TE information describes the resources associated with each link, e.g., TE information may describe the available bandwidth not being consumed on a particular link. Thus, an IS-IS packet may carry both routing information and non-routing information in TLVs and sub-TLVs.

With the increase of MPLS-TE development and deployment, IS-IS packets are carrying more non-routing information, especially TE information. When a router receives a new LSP, the router determines if the state of any links in the network has changed, e.g., a new link may be available or a particular link may be unavailable. This determination requires that the router read, parse, and process all information contained within each TLV and sub-TLV in the LSP, including any non-routing information, even though the non-routing information is not used in updating a router's LSDBs, RIBs and FIBs. As a result, the time it takes for routers of the network to achieve convergence may be increased beyond an acceptable threshold, and the performance of the router is negatively impacted.

Based on the foregoing, there is a clear need for an improved method for the dissemination of non-routing information to nodes of a network.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the embodiments of the invention presented herein. It will be apparent, however, that embodiments of the invention may be practiced without these specific details. In other instances, well-known structures and devices are shown in block diagram form in order to avoid unnecessarily obscuring the description of the embodiments of the invention presented herein.

Functional Overview

Embodiments of the invention advantageously provide for a new type of IS-IS packet (referred to below as a "non-routing information" IS-IS packet, abbreviated as a NRI IS-IS packet) that exclusively carries non-routing information. Non-routing information is exclusively carried by the NRI IS-IS packet, and routing information may be carried by the existing types of IS-IS packets, each referred to herein as a "routing information" packet, or RI IS-IS packet. RI IS-IS packets carry all topological information for routers, and may comprise TLVs and sub-TLVs storing information related to IP prefixes.

As used herein, an IS-IS packet refers to any packet that conforms to the IS-IS protocol, and may include either a NRI IS-IS packet or a RI IS-IS packet.

When the NRI IS-IS packet is received by a router and recognized as an NRI IS-IS packet, the router may send the NRI IS-IS packet to an appropriate component responsible for processing non-routing information, without analyzing, verifying, and validating the information carried in each TLV and sub-TLV of the NRI IS-IS packet. Advantageously, the time for routers of the network to achieve convergence is decreased since the IS-IS packet reader need not analyze, verify, and validate information not related to network topology and IP routing. Therefore, when NRI IS-IS packets are received, there is no impact in the convergence time of nodes in the network.

To illustrate, the operation of an exemplary embodiment of the invention shall be described. A NRI IS-IS packet is generated at a first node of a network. The NRI IS-IS packet is a packet that conforms to the IS-IS protocol, and is a first type of IS-IS packet that exclusively carries non-routing information. The NRI IS-IS packet is not a second type of IS-IS packet that is capable of carrying routing information.

Thereafter, the NRI IS-IS packet is transmitted to a second node of the network. The NRI IS-IS packet is received at the second node. The second node determines that the NRI IS-IS packet is of the first type without examining the contents of the IS-IS packet to determine the non-routing information carried by the NRI IS-IS packet. The second node then sends the NRI IS-IS packet to a processing component that is configured to process IS-IS packets of the first type of IS-IS packet.

Architecture Overview

Figure 1:
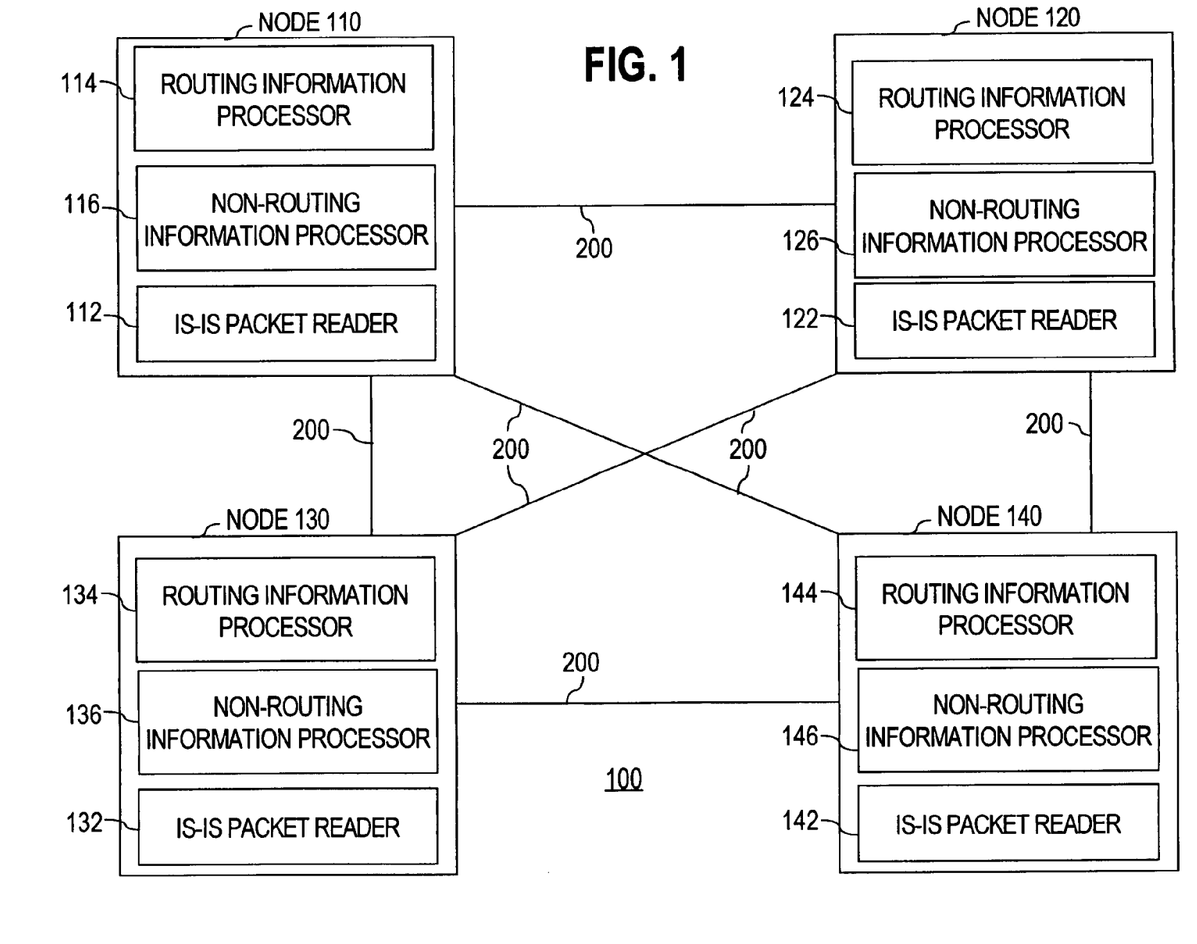
FIG. 1 is a block diagram of an illustrative system according to an embodiment of the invention.

FIG. 1 is a block diagram of an illustrative system 100 according to an embodiment of the invention. The system 100 of FIG. 1 may be employed to disseminate non-routing information to nodes of a network according to an embodiment of the invention.

System 100 may include any number of nodes. For example, the illustrative system of FIG. 1 has four nodes, namely nodes 110, 120, 130, and 140. Each node of system 100 may be implemented by any medium or mechanism that provides for receiving packets and sending packets. Nodes of system 100 may exchange NRI IS-IS packets with one another. Non-limiting, illustrative examples of nodes 110, 120, 130, and 140 include, without limitation, a router, a switch, and a hub.

Each node of system 110 comprises an IS-IS packet reader, a routing information processor, and a non-routing information processor. An IS-IS packet reader, such as IS-IS packet readers 112, 122, 132, and 142, may be implemented by any medium or mechanism that provides for reading an IS-IS packet. A router may use an IS-IS packet reader to analyze, verify, and validate the information carried in each TLV and sub-TLV of an IS-IS packet.

A routing information processor, such as routing information processors 114, 124, 134, and 144, may be implemented by any medium or mechanism that provides for processing routing information contained within an IS-IS packet. A node may use a routing information processor to read and process routing information carried by the RI IS-IS packet. For example, a routing information processor may be involved in updating a router's LSDBs, RIBs and FIBs.

A non-routing information processor, such as routing information processors 116, 126, 136, and 146, may be implemented by any medium or mechanism that provides for processing non-routing information contained within an IS-IS packet. A non-routing information processor may be a software component resident upon a router. A node, after sending a particular IS-IS packet that contains non-routing information to the non-routing information processor for processing, may use a routing non-information processor to read and process the non-routing information carried by the NRI IS-IS packet. For example, a non-routing information processor may be implemented by a MPLS-TE component of a router, which may use the non-routing information contained within the IS-IS packet to create, signal, and establish a TE tunnel.

Communications link 200 may be implemented by any medium or mechanism that provides for the exchange of data between nodes of system 100. Examples of communications link 200 include, without limitation, a network such as a Local Area Network (LAN), Wide Area Network (WAN), Ethernet or the Internet, or one or more terrestrial, satellite or wireless links.

Sending and Receiving Non-Routing Information (NRI) IS-IS Packets

Figure 2:
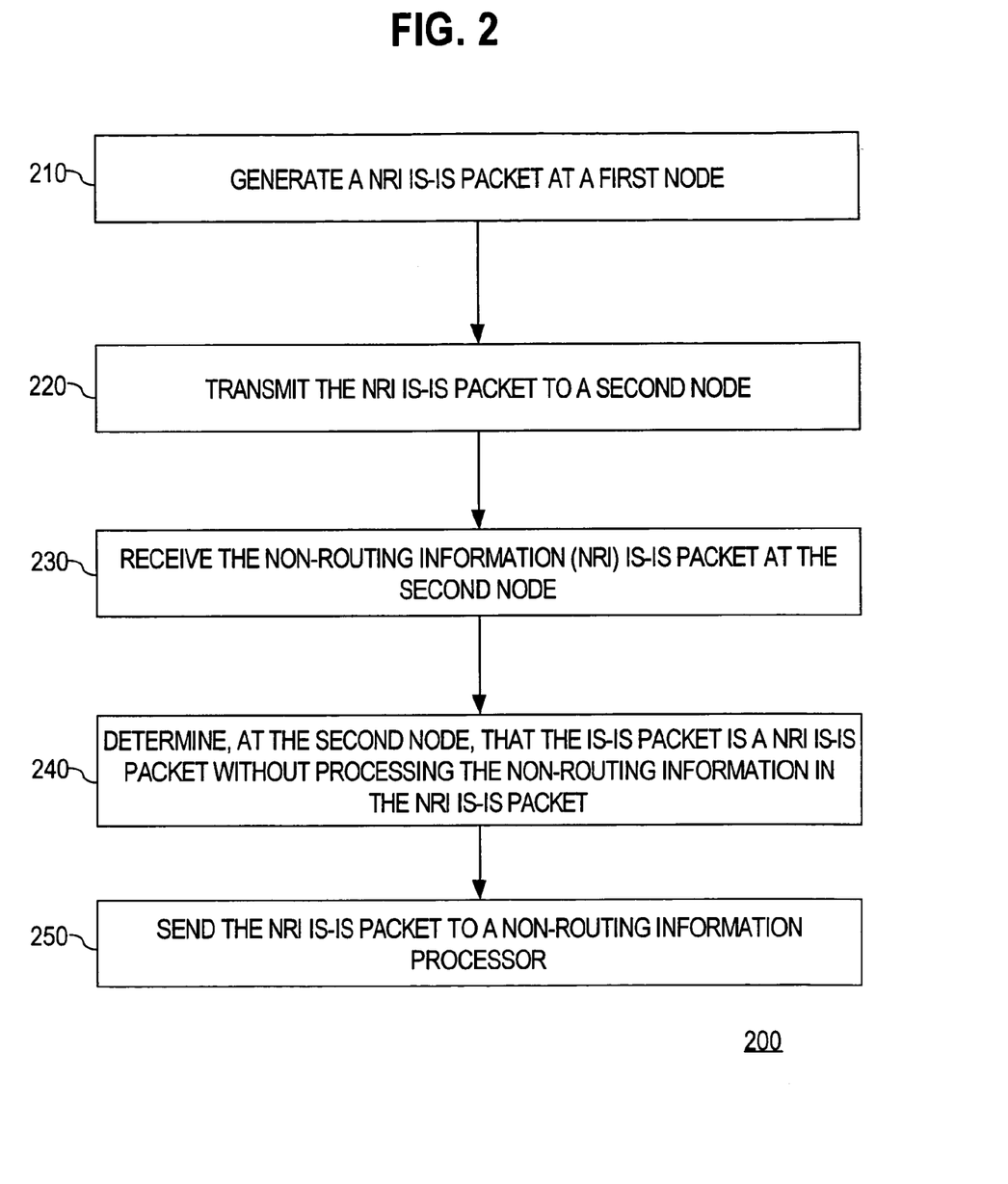
FIG. 2 is a flowchart illustrating the functional steps performed by an embodiment of the invention.

FIG. 2 is a flowchart illustrating the functional steps performed by an embodiment of the invention. By performing the steps of FIG. 2, non-routing information may be exchanged between nodes of system 100 using a NRI IS-IS packet.

In step 210, a NRI IS-IS packet is generated at a first node of the system 100. To illustrate, the performance of step 210 may be performed by a NRI IS-IS packet being generated at node 110.

The NRI IS-IS packet generated in step 210 may carry non-routing information in TLVs and/or sub-TLVs. In an embodiment, the NRI IS-IS packet may carry non-routing information in sub-TLV-22, which is a format of TLV well known to those skilled in the art.

Figure 3:
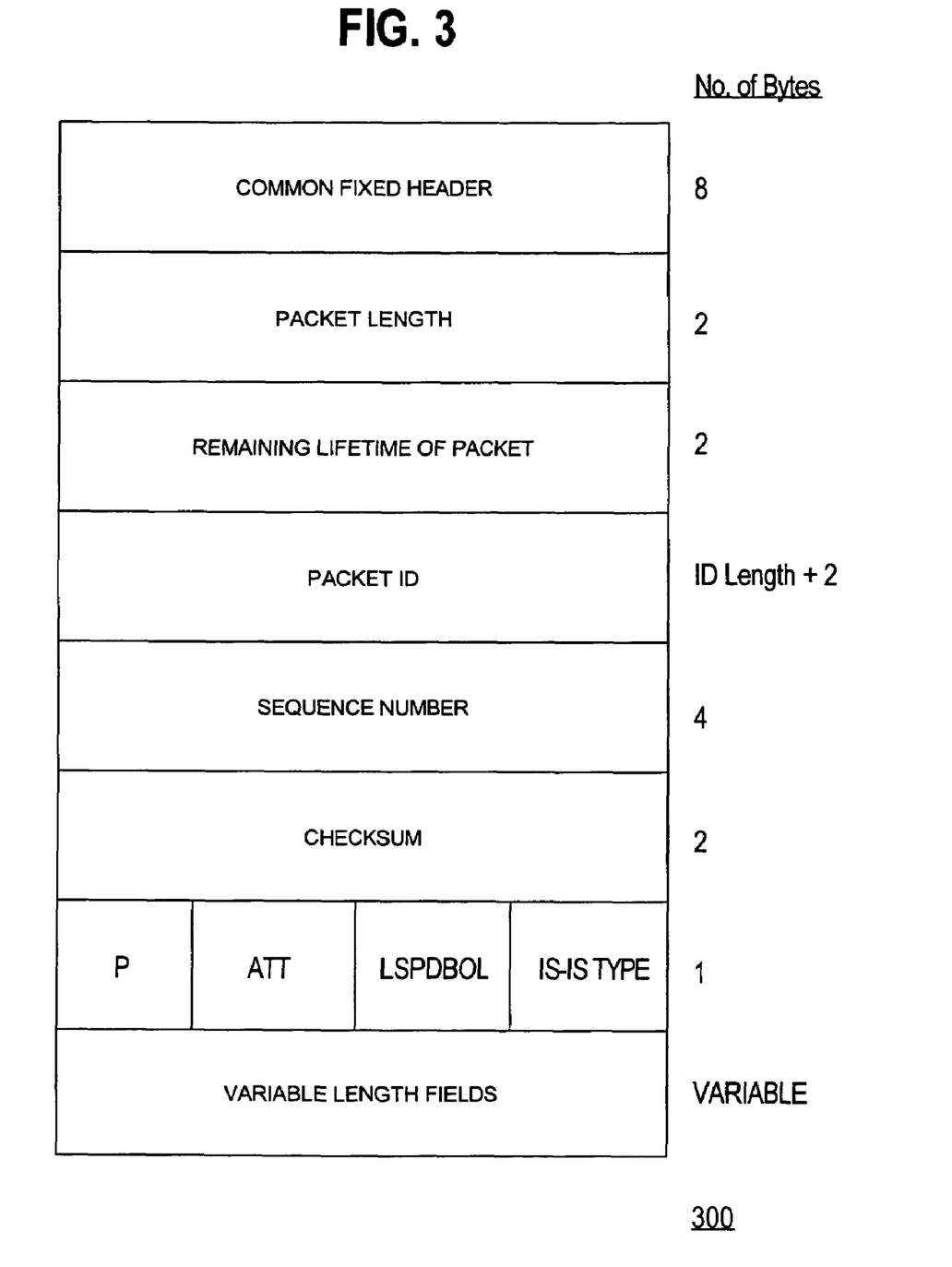
FIG. 3 is a illustration of a non-routing information (NRI) IS-IS packet according to one embodiment of the invention.

A NRI IS-IS packet may be implemented using a variety of formats. For example, FIG. 3 is an illustration of a NRI IS-IS packet according to one embodiment of the invention. The illustration of FIG. 3 depicts a format of a LSP packet.

Certain bits of the LSP packet depicted in FIG. 3 may be used to identify characteristics about the LSP packet, e.g., certain bits may identify the packet as a NRI IS-IS packet. For example, in one embodiment, an IS-IS packet may be identified as an NRI IS-IS packet by the value of one or more bits in a field of the header of the IS-IS packet.

In other embodiments, information in other parts of the IS-IS packet may identify the IS-IS packet as a NRI IS-IS packet. For example, bits 1 and 2 of the IS-IS Type field may be used to identify the intermediate system level associated with the IS-IS packet. The intermediate system level (which may either be level 1 or level 2) refers to how where the IS-IS packet should be propagated within a network. As is well known to those in the art, level 1 refers to IS-IS packets that are exchanged within an area, and level 2 refers to IS-IS packets that are propagated from one area to another area.

If the value of bit 1 and 2 of the IS-IS type field is 1, then the intermediate system level of the packet is level 1. If the value of bit 1 and 2 of the IS-IS type field is 3, then the intermediate system level of the packet is level 2.

Values 0 and 2 of bits 1 and 2 of the IS-IS type filed are not used, and those values may be used to identify (a) that the packet is a NRI IS-IS packet, and (b) which intermediate system level (in other words, level 1 or level 2) is associated with the NRI IS-IS packet. Specifically, if the value of bits 1 and 2 of the IS-IS type field is 0, then that may indicate that the packet is a NRI IS-IS packet associated with an intermediate system level of level 1. If the value of bits 1 and 2 of the IS-IS type field is 2, then that may indicate that the packet is a NRI IS-IS packet associated with an intermediate system level of level 2. The use of the values of bits 1 and 2 of the IS-IS type field is merely illustrative, as the values of other bits of the packet may also be used to identify that the packet is a NRI IS-IS packet.

In an alternate embodiment, a NRI IS-IS packet may be embodied differently than as depicted in FIG. 3. For example, a new TLV may be used to identify a packet as a NRI IS-IS packet. The new TLV will be the first TLV encoded in any fragment of the packet, so when the packet is initially read by a IS-IS packet reader, the IS-IS packet reader may quickly ascertain that the packet is a NRI IS-IS packet without parsing the entire packet. After identifying the packet as an NRI-IS-IS packet, the IS-IS packet reader may forward the NRI IS-IS packet to a non-routing information processor for processing.

In an embodiment, the new TLV may be embodied by a new TLV or sub-TLV. For example, a sub-TLV of 32 bits may be used. By virtue of using the new TLV or sub-TLV, the packet may be identified as a NRI IS-IS packet. Certain bits of the sub-TLV or TLV may be used to identify which intermediate system level (in other words, level 1 or level 2) is associated with the NRI IS-IS packet. For example, bit 0 of the new TLV or sub-TLV may correspond to the scope ("the scope bit"). If the scope bit has a value of 0, then the NRI IS-IS packet should not be propagated to another level. If the scope bit has a value of 1, then the NRI IS-IS packet should be propagated to another level.

Bit 1 of the new TLV or sub-TLV may identify whether the NRI IS-IS packet has been propagated from level 2 into level 1. The value of this bit may be set to 1 if the NRI IS-IS packet has propagated from an area associated with level 2 into an area associated with level 1. If the value of this bit is 1, the NRI IS-IS packet will not be propagated back into the area associated with level 2.

The above discussion of the formats that may be used to represent a NRI IS-IS packet is merely illustrative, as other bits of the LSP may be used to identify that the LSP is a NRI IS-IS packet. In particular, other bits of a TLV or sub-TLV than those discussed above may be used as the scope bit or to identify whether the NRI IS-IS packet has been propagated from an area associated with level 2 into an area associated with level 1. Indeed, other bits of a TLV or sub-TLV may be used to identify any characteristic of the NRI IS-IS packet, even those not discussed above.

After the NRI IS-IS packet has been generated at the first node, processing proceeds to step 220.

In step 220, the NRI IS-IS packet is transmitted from the first node to a second node of the system 100. For example, if in step 210, the NRI IS-IS packet is generated node at node 110, then step 220 may be performed by node 110 transmitting the NRI IS-IS packet to node 130. After the performance of step 220, processing proceeds to step 230.

In step 230, the NRI IS-IS packet is received at the second node of the system 100. For example, step 230 may be performed by the NRI IS-IS packet being received at node 130. After the performance of step 230, processing proceeds to step 240.

In step 240, a determination is made, at the second node, as to whether the packet received in step 230 is a NRI IS-IS packet. When a packet is received at a node, the packet reader at that node reads the packet. For example, if the NRI IS-IS packet is received at node 130 in step 230, then packet reader 132 reads the packet in step 230. Packet reader 132 may determine whether the packet received in step 230 is a NRI IS-IS packet. If packet reader 132 determines that the packet received in step 230 is a NRI IS-IS packet, then processing proceeds to step 250.

In step 250, the NRI IS-IS packet is sent to a non-routing information processor. For example, if packet reader 132 determines that the packet received in step 230 is a NRI IS-IS packet, then in step 250, the NRI IS-IS packet is sent to non-routing information processor 136 for processing. Advantageously, when the NRI IS-IS packet is received by a router, the router may send the NRI IS-IS packet to the non-routing information processor, without analyzing, verifying, and validating the information carried in each TLV and sub-TLV of the NRI IS-IS packet.

The non-routing information processor may read and process non-routing information carried by the NRI IS-IS packet. For example, the non-routing information processor may use the non-routing information contained within the IS-IS packet to create, signal, and establish a TE tunnel. As the routing-information processor of the node receiving the NRI IS-IS packet does not process the NRI IS-IS packet, the time required for the node to achieve convergence is not impacted by the receipt of the NRI IS-IS packet.

Non-routing information processors may use a different flooding scope for NRI IS-IS packets than compared to RI IS-IS packets. Non-routing information processors may store flooding information that identifies a first different flooding scope for NRI IS-IS packets and a second flooding scope for RI IS-IS packets. Non-routing information processor may use either the stored flooding information or information contained within the NRI IS-IS packet to determine whether to flood the NRI IS-IS packet across levels or area boundaries.

Implementing Mechanisms

Figure 4:
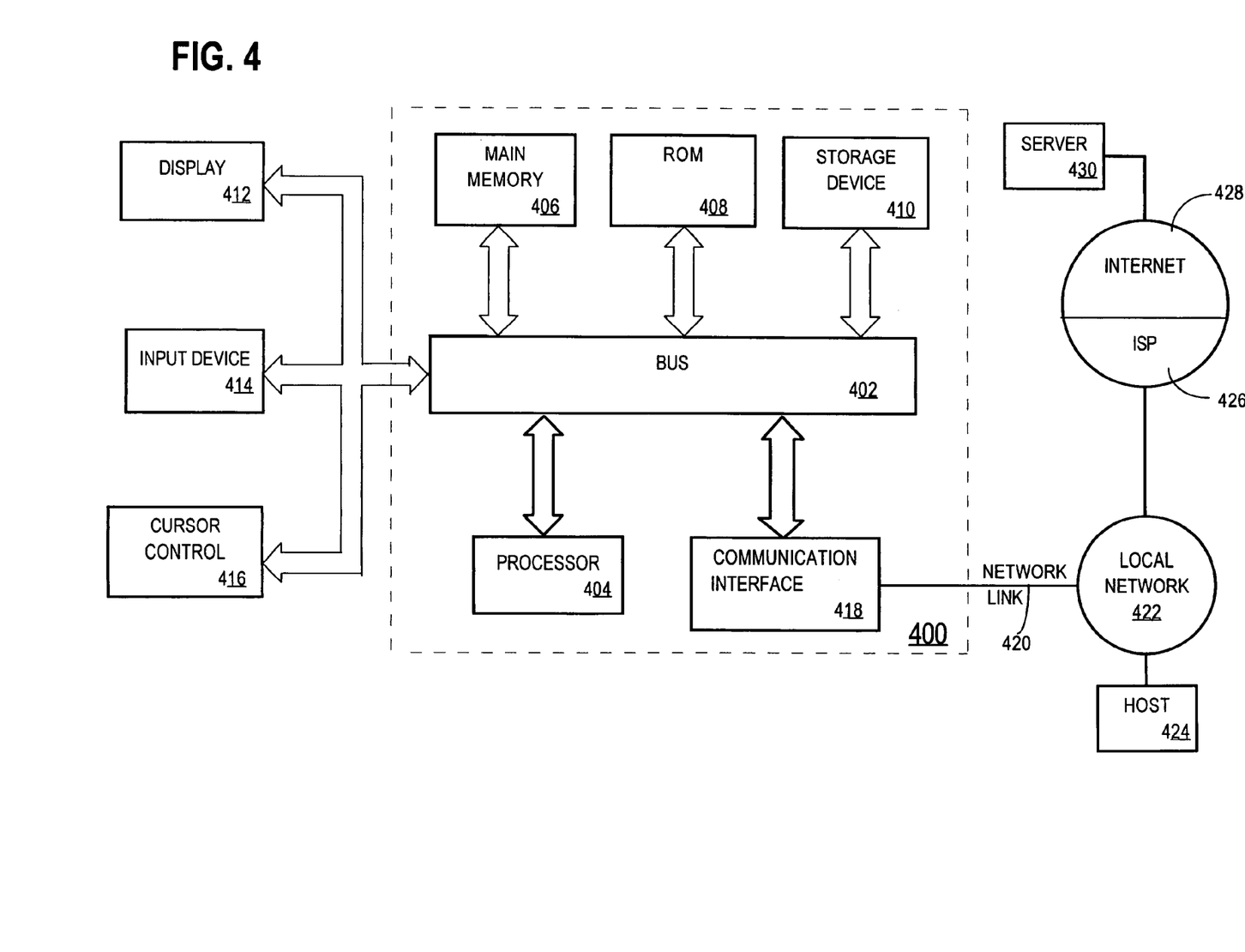
FIG. 4 is a block diagram that illustrates a computer system upon which an embodiment of the invention may be implemented.

Each node of system 100 may be implemented on a computer system 100. FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 400, various machine-readable media are involved, for example, in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infrared data communications.

Common forms of machine-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector can receive the data carried in the infrared signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world-wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A machine-implemented method, comprising the steps of:
   generating, at a first node of a network, an Intermediate System-to-Intermediate System (IS IS) packet that conforms to the IS-IS protocol;
   wherein said IS-IS packet is a first type of IS-IS packet that exclusively carries non-routing information, and wherein said IS-IS packet is not a second type of IS-IS packet that is operable to carry routing information; and
   transmitting the IS-IS packet to a second node of the network,
   wherein the IS-IS packet comprises a particular Type Length Value (TLV) or sub-TLV, and wherein the particular TLV or sub-TLV indicates that the IS-IS packet is of the first type.

2. The method of claim 1, wherein the non-routing information carried by the IS-IS packet is traffic engineering information.

3. The method of claim 1, wherein the first type of the IS-IS packet is identified in a field of a header of the IS-IS packet.

4. The method of claim 1, wherein the first type of the IS-IS packet is identified in an IS-IS type field of the IS-IS packet.

5. The method of claim 4, wherein the IS-IS type field comprises a first bit and a second bit, and wherein the first bit and the second bit having a value of 0 or 2 indicates (a) the IS-IS packet is of the first type, and (b) the IS-IS packet is associated with a particular intermediate system level.

6. The method of claim 1, wherein a value of one or more bits of the particular TLV or sub-TLV indicates an intermediate system level associated with the IS-IS packet.

7. The method of claim 1, wherein the non-routing information is carried in one or more tuples of the IS-IS packet, wherein each of the one or more tuples conforms with the TLV-22 format.

8. The method of claim 1, further comprising the step of:
   storing flooding information, at said second node, that identifies a different flooding scope for said first type of IS-IS packet compared to said second type of IS-IS packet.

9. A machine-implemented method, comprising the steps of:
   receiving, at a node of a network, an Intermediate System-to-Intermediate System (IS-IS) packet that conforms to the IS-IS protocol,
   wherein said IS-IS packet is a first type of IS-IS packet that exclusively carries non-routing information, and wherein said IS-IS packet is not a second type of IS-IS packet that is operable to carry routing information;
   determining that the IS-IS packet is of the first type without processing the IS-IS packet to determine the non-routing information carried therein; and
   sending the IS-IS packet to a processing component that is configured to process IS-IS packets of said first type,
   wherein the IS-IS packet comprises a particular Type Length Value (TLV) or sub-TLV, and wherein the particular TLV or sub-TLV indicates that the IS-IS packet is of the first type.

10. The method of claim 9, wherein the IS-IS packet is a first IS-IS-packet, and the method further comprises:
    receiving, at the node, a second IS-IS packet after the receipt of the first IS-IS packet, wherein the second IS-IS packet conforms to the IS-IS protocol, and wherein the second IS-IS packet is the second type of IS-IS packet;
    processing, at the node, the second IS-IS packet to determine the routing information carried therein,
    updating the LSDBs, RIBs and FIBs of the node to reflect the routing information carried within the second IS-IS packet,
    wherein the functional component that processed the second IS-IS packet is not the processing component.

11. The method of claim 9, further comprising the step of:
    determining, at the processing component, a flooding scope for said IS-IS packet.

12. The method of claim 11, wherein said step of determining the flooding scope comprises the step of:
    consulting flooding information, stored at or accessible to the processing component, that describes the flooding scope of IS-IS packets of the first type.

13. The method of claim 11, wherein said step of determining the flooding scope comprises the step of:
    consulting flooding information carried by the IS-IS packet, wherein the flooding information describes the flooding scope of the IS-IS packet.

14. A machine-readable volatile or non-volatile storage medium storing one or more sequences of instructions, wherein execution of the one or more sequences of instructions by one or more processors causes the one or more processors to perform the steps of:
    generating, at a first node of a network, an Intermediate System-to-Intermediate System (IS-IS) packet that conforms to the IS-IS protocol, wherein said IS-IS packet is a first type of IS-IS packet that exclusively carries non-routing information, and wherein said IS-IS packet is not a second type of IS-IS packet that is operable to carry routing information; and transmitting the IS-IS packet to a second node of the network, wherein the IS-IS packet comprises a particular (Type Length Value (TLV) or sub-TLV, and wherein the particular TLV or sub-TLV indicates that the IS-IS packet is of the first type.

15. The machine-readable medium of claim 14, wherein the non-routing information carried by the IS-IS packet is traffic engineering information.

16. The machine-readable medium of claim 14, wherein the type of the IS-IS packet is identified in a field of a header of the IS-IS packet.

17. The machine-readable medium of claim 14, wherein the type of the IS-IS packet is identified in an IS-IS type field of the IS-IS packet.

18. The machine-readable medium of claim 17, wherein the IS-IS type field comprises a first bit and a second bit, and wherein the first bit and the second bit having a value of 0 or 2 indicates (a) the IS-IS packet is of the first type, and (b) the IS-IS packet is associated with a particular intermediate system level.

19. The machine-readable medium of claim 14, wherein a value of one or more bits of the particular TLV or sub-TLV indicates an intermediate system level associated with the IS-IS packet.

20. The machine-readable medium of claim 14, wherein the non-routing information is carried in one or more tuples of the IS-IS packet, wherein each of the one or more tuples conforms with the TLV-22 format.

21. The machine-readable medium of claim 14, wherein execution of the one or more sequences of instructions by the one or more processors causes the one or more processors to perform the step of:

storing flooding information, at said second node, that identifies a different flooding scope for said first type of IS-IS packet compared to said second type of IS-IS packet.

22. A machine-readable volatile or non-volatile storage medium storing one or more sequences of instructions, wherein execution of the one or more sequences of instructions by one or more processors causes the one or more processors to perform the steps of:

receiving, at a node of a network, an Intermediate System-to-Intermediate System (IS-IS) packet that conforms to the IS-IS protocol, wherein said IS-IS packet is a first type of IS-IS packet that exclusively carries non-routing information, and wherein said IS-IS packet is not a second type of IS-IS packet that is operable to carry routing information;

determining that the IS-IS packet is of the first type without processing the IS-IS packet to determine the non-routing information carried therein; and sending the IS-IS packet to a processing component, wherein the processing component is configured to process IS-IS packets of said first type, wherein the IS-IS packet comprises a particular Type Length Value (TLV) or sub-TLV, and wherein the particular TLV or sub-TLV indicates that the IS-IS packet is of the first type.

23. The machine-readable medium of claim 22, wherein the IS-IS packet is a first IS-IS-packet, and the method further comprises:

receiving, at the node, a second IS-IS packet after the receipt of the first IS-IS packet, wherein the second IS-IS packet conforms to the IS-IS protocol, and wherein the second IS-IS packet is the second type of IS-IS packet;

processing, at the node, the second IS-IS packet to determine the routing information carried therein, updating the LSDBs, RIBs and FIBs of the node to reflect the routing information carried within the second IS-IS packet, wherein the functional component that processed the second IS-IS packet is not the processing component.

24. The machine-readable medium claim 22, wherein execution of the one or more sequences of instructions by the one or more processors causes the one or more processors to perform the step of:

determining, at the processing component, a flooding scope for said IS-IS packet.

25. The machine-readable medium of claim 24, wherein said step of determining the flooding scope comprises the step of:

consulting flooding information, stored at or accessible to the processing component, that describes the flooding scope of IS-IS packets of the first type.

26. The machine-readable medium of claim 24, wherein said step of determining the flooding scope comprises the step of:

consulting flooding information carried by the IS-IS packet, wherein the flooding information describes the flooding scope of the IS-IS packet.

* * * * *